(12) United States Patent
Peiro et al.

(10) Patent No.: US 7,576,890 B2
(45) Date of Patent: Aug. 18, 2009

(54) DIGITAL SWATCH BOOK

(75) Inventors: Jose Abad Peiro, Barcelona (ES); Jordi Arnabat Benedicto, Tarragona (ES); Ignacio Ruiz de Conejo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 11/254,674

(22) Filed: Oct. 21, 2005

(65) Prior Publication Data

US 2007/0091336 A1    Apr. 26, 2007

(51) Int. Cl.
  *H04N 1/60* (2006.01)
  *G06K 15/00* (2006.01)
  *H04N 1/403* (2006.01)
  *H04N 1/40* (2006.01)
  *G06K 9/36* (2006.01)

(52) U.S. Cl. ............... 358/1.9; 358/2.1; 358/2.99; 358/3.01; 382/166

(58) Field of Classification Search ............... 358/1.9, 358/3.23, 518
  See application file for complete search history.

(56) References Cited

U.S. PATENT DOCUMENTS 6,665,435 B1 * 12/2003 Caldato et al. ............. 382/166
  2004/0145758 A1 * 7/2004 Lamy et al. ................ 358/1.9
  2007/0030527 A1 * 2/2007 Fuchigami .................. 358/448

FOREIGN PATENT DOCUMENTS

EP    1420233 A1    5/2004

OTHER PUBLICATIONS

Title: Adobe Acrobat 7 Tips and Tricks: The 150 Best, Author: Donna L. Baker, Publisher: Adobe Press, Pub Date: Jan. 24, 2005, ISBN-10: 0-321-30530-2, ISBN-13: 978-0-321-30530-5, pp. 234-235.*
ISO 15930-3: 2002 Graphic technology- Prepress digital data exchange—Use of PDF—Part 3: Complete exchange suitable for colour-managed workflows (PDF/X-3), ISO, 2002.
CIE 156: 2004—Guidelines for the Evaluation of Gamut Mapping Alborithms, published in 2004 by the CIE—Commission Internationale de l'Eclairage.

\* cited by examiner

*Primary Examiner*—Twyler L Haskins
*Assistant Examiner*—Barbara D Reinier

(57) ABSTRACT

A system for generating digital swatch books, comprising a simulation component for generating, based on a set of standard reference colors and based on at least one reproduction system profile representing a reproduction system's color reproduction characteristics, digital swatch book information representing a simulated set of reference colors associated with the original set of reference colors, as reproduced by the reproduction system; the system further comprising a portable document format generation component for generating, from said digital swatch book information, a multi-layer portable document format file comprising a first layer encoding first swatch book output information for viewing the digital swatch book on a display device, and a second layer encoding second swatch book output information for printing the digital swatch book on a printing device.

20 Claims, 8 Drawing Sheets

```xml
<?xml version="1.0" encoding="UTF-8"?>
<!--Sample XML file generated by XML Spy v4.4 U
(http://www.xmlspy.com)-->
<swatchBook xmlns:xsi="http://www.w3.org/2001/XMLSchema-
instance" xsi:noNamespaceSchemaLocation = "C:\
swatchBook1.xsd">
    <name>Sample Swatch Book</name>
    <author>Jose L. Abad</author>
    <version>1.0</version>
    <device>hp designjet Device</device>
    <media>Proof Matte</media>
    <printMode>600x600</printMode>
    <colorSpace>CMYK</colorSpace>

<name>1.1C</name>
        <fields>
            <field>
                <name>Yellow C</name>
                <formula>3.5 0.0 97.5 0.0</formula>
                <lab>84 4 90</lab>
                <deltas>13.65</deltas>
            </field>
            <field>
                <name>Yellow 012 C</name>
                <formula>3.0 0.0 98.3 0.0</formula>
                <lab>84 5 92</lab>
                <deltas>2.46</deltas>
            </field>
            <field>
                <name>Orange 021 C</name>
                <formula>0.0 60.0 99.2 0.0</formula>
                <lab>60 50 62</lab>
                <deltas>2.62</deltas>
            </field>
            <field>
                <name>Warm Red C</name>
                <formula>0.0 79.3 89.3 0.0</formula>
                <lab>53 58 42</lab>
                <deltas>1.16</deltas>
            </field>
            <field>
                <name>Red 032 C</name>
                <formula>0.0 89.2 91.6 0.0</formula>
                <lab>49 63 40</lab>
                <deltas>1.84</deltas>
            </field>
            <field>
                <name>Rubine Red C</name>
                <formula>0.0 97.5 46.5 0.0</formula>
                <lab>46 69 9</lab>
                <deltas>9.03</deltas>
            </field>
            <field>
                <name>Rhodamine Red C</name>
                <formula>0.0 92.0 9.9 0.0</formula>
                <lab>50 70 -13</lab>
                <deltas>8.81</deltas>
            </field>
        </fields>

DIGITAL SWATCH BOOK

FIELD OF THE INVENTION

The present invention relates generally to the field of color management, and, for example, to digital swatch books, a system for generating digital swatch books or a method for generating digital swatch books.

BACKGROUND OF THE INVENTION

With traditional analog techniques, the challenge of choosing colors for graphical elements such as company logos consisted solely in making the right color choice from among the colors in a specially printed swatch book. A graphic designer could focus on choosing a color that embodies the image the client wanted to project and once the choice was made, it could be simply and reliably communicated to a print service provider. In the case of the swatch books most popular in North America and Europe—the PANTONE® Formula Guide—the graphic designer simply specified the name of the Pantone color (e.g. "PANTONE 653 C"—i.e., HP's corporate identity color) and if additional reassurance was desired a physical color chip showing the color and sold by Pantone® could also be provided. The print service provider would then use the PANTONE® Formula Guide, look up the chosen color and from there see the recipe according to which the fifteen basic inks of the Pantone® system needed to be mixed to give the specified color.

Today, however, the neat and simple approach described above is no longer viable due to the ever increasing use of a variety of digital printing systems, which are not compatible with the use of the fifteen basic Pantone® inks, but, instead, rely on their own specific printing techniques which might, e.g., be based on a different set of inks and ways of addressing their use. With each printing system, a different range of printable colors (i.e. color gamut) is obtained, and, furthermore, the range of obtained colors also depends on the particular print medium used in combination with the digital printing system. In general, the obtained range of colors does not include all of the reference colors, making it necessary to try to reproduce as much as possible a predetermined color choice in a given printing system.

As a result, the task of the graphic designer becomes significantly more complex in cases where a design is to be printed, even if at least partially, digitally. If, for example, a company wishes to print a large format poster that includes their logo (whose color is defined in Pantone® terms) or if a number of leaflets or brochures is to be printed using a laser printer or digital press, then the designer needs to deal with the gamut differences between the Pantone® set and the digital printing systems.

This problem is addressed by reference color simulation techniques which aim at finding for each reference color its best representation in the gamut of a particular combination of printer and print medium.

Providing good simulations of Pantone® colors on a given medium is clearly very important, but color simulation techniques are purely computational approaches which do not yet address the problem of usability and interactivity of digital color simulation systems.

The proposed invention thus addresses aspects which are related to the usability of a color simulation system, e.g. the following problems: First, when looking at a digital print it can be a challenge to see how well a Pantone® color is simulated with just the original PANTONE® Formula Guide available as what one compares is a relatively small color chip, on the one hand, and a colored graphical element, like a logo, on the other. Second, when looking at a simulation that is different from the original Pantone® color, it is not clear whether the differences are genuinely due to a gamut difference or due to workflow issues. Third, before printing Pantone® simulations on a digital printing system the designer does not know how close the simulation will be to the original color. Fourth, if matching a Pantone® color is more important than the choice of media used in the digital printing system the designer is currently faced with many trial and error sessions. Fifth, if the agreement between original and digitally simulated colors is more important than the precise color choice, again the designer needs to do significant trial and error work.

EP 1420233 A1 describes a method for generating a digital standard color system for the generation and reproduction of standardized colors, called swatch books. Those colors of a swatch book which can be reproduced by a certain printing press and substrate form what is called a "custom book" in EP 1420233. The information forming such a custom book is represented by files according to an XML-based format.

SUMMARY OF THE INVENTION

According to a first aspect of the invention, a system for generating digital swatch books is provided, comprising a simulation component for generating, based on a set of standard reference colors and based on at least one reproduction system profile representing a reproduction system's color reproduction characteristics, digital swatch book information representing a simulated set of reference colors associated with the original set of reference colors, as reproduced by the reproduction system; a portable document format generation component for generating, from said digital swatch book information, a multi-layer portable document format file comprising a first layer encoding first swatch book output information for viewing the digital swatch book on a display device, and a second layer encoding second swatch book output information for printing the digital swatch book on a printing device.

According to another aspect of the invention, a digital swatch book is provided, which is either stored on a machine-readable medium, or is in the form of a propagated signal, including a multi-layer portable document format file which comprises a first layer encoding first swatch book output information for viewing the digital swatch book on a display device, and a second layer encoding second swatch book output information for printing the digital swatch book on a printing device, the first and second swatch book output information representing a simulated set of reference colors associated with an original set of reference colors, as reproduced by at least one reproduction system.

According to yet another aspect of the invention, a method of generating digital swatch books is provided, comprising a first step of generating, based on a set of standard reference colors and based on at least one reproduction system profile representing a reproduction system's color reproduction characteristics, digital swatch book information representing a simulated set of reference colors associated with the original set of reference colors, as reproduced by the reproduction system; a second step of generating, from said digital swatch book information, a multi-layer portable document format file comprising a first layer encoding first swatch book output information for viewing the digital swatch book on a display device, and a second layer encoding second swatch book output information for printing the digital swatch book on a printing device.

BRIEF DESCRIPTION OF THE DRAWINGS

Embodiments of the invention will now be described, by way of example, and with reference to the accompanying drawings, wherein:

FIG. 3 is an exemplary XML data file comprising digital swatch book information as provided by the simulation component of the system for generating digital swatch books;

The drawings and their description are embodiments of the invention and not the invention itself.

DESCRIPTION OF THE PREFERRED EMBODIMENTS

Figure 1:
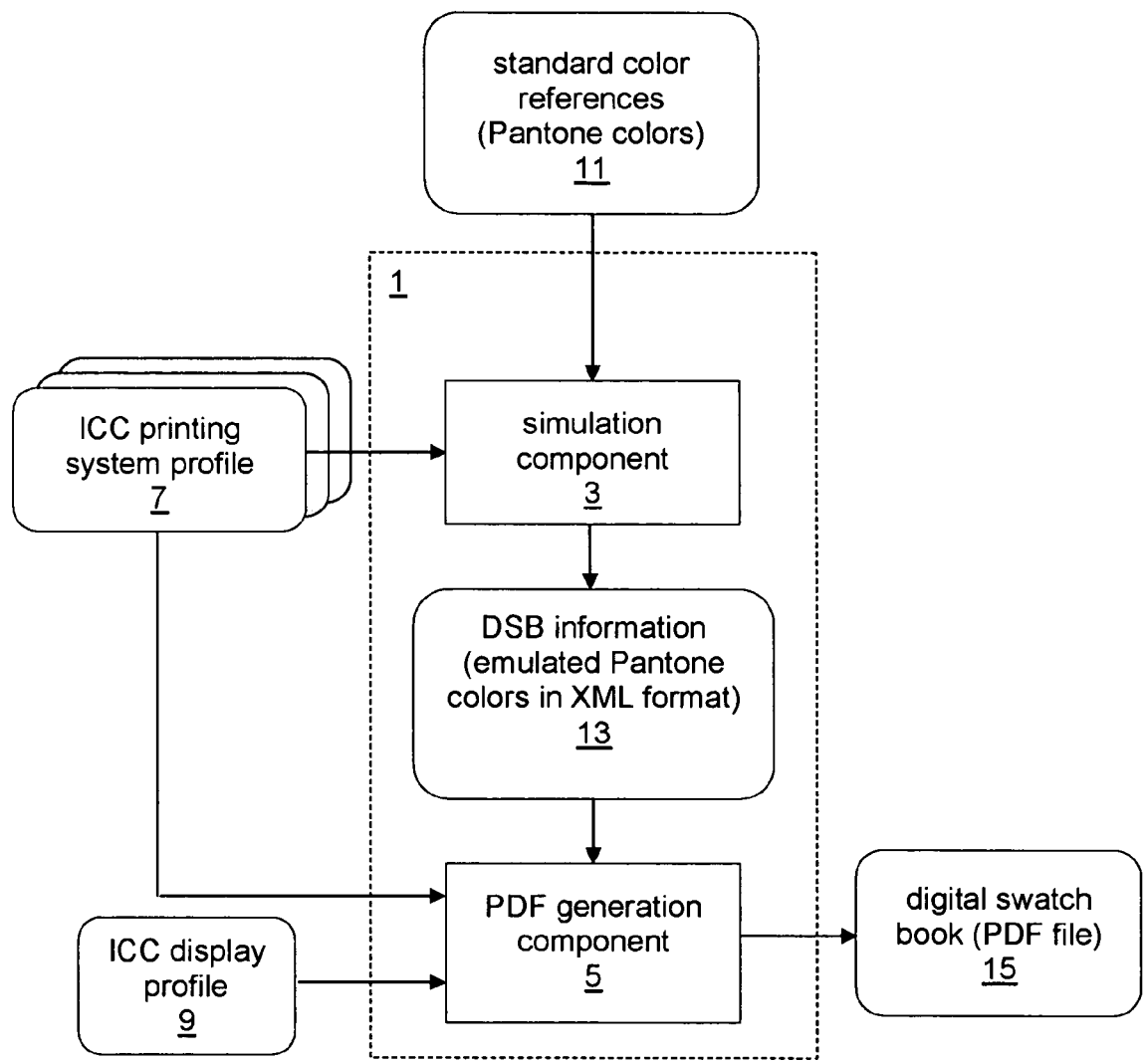
FIG. 1 is a block diagram of an embodiment of a system for generating digital swatch books.

FIG. 1, shows a schematic diagram of an embodiment of a system for generating digital swatch books. Before proceeding further with the detailed description of FIG. 1, however, a few general items of the embodiments will be discussed.

The embodiments are directed at a system for generating digital swatch books (DSBs) which are the digital counterparts of traditional swatch books. A swatch book is a collection of color patches, uniform identifiable color areas, arranged in a particular layout with the purpose of cataloging a given set of colors. Typically, color swatch books follow standards that dictate layout arrangement and color properties of the swatches so that proper communication is facilitated among users and thus confusion avoided as to color references. A swatch book is used by professionals such as the manufacturers of ink or paint and the designers or artists that finally use these products to describe colors in a reproducible way. Since describing colors by mere words lacks precision, professionals prefer to use collections of color samples as a reference. Such color catalogs exist in standardized form as color systems, like the Pantone®, the RAL™, or the Munsell™, color systems for example, and instead of trying to characterize a color in mind as, for instance, a "rather reddish not so dark yellow", one can look up a swatch-book and identify this color precisely as e.g. "Pantone® number 653 C." Using this number, and the production formula related to this number by the color system standard, a color manufacturer can brew and deliver an ink, or whatever colorant, that matches the special color in mind.

While the real world offers an infinite number of colors in a continuum, a standard color system samples only a subset of them consisting of a finite number of individual colors (in the following are called standard reference colors). Therefore standard colors are used mainly where color precision is emphasized over pictorial qualities, as for the creation and reproduction of graphical elements like corporate logos or signs, for industrial and interior design, in the textile and packaging industry, and so on. Since the standard color system defines the colorant, it guaranties the consistency of a product's color appearance and that any graphical element matches the designer's intention—as long as each single color of an image is produced by using a colorant of that color.

Even though in the embodiments described below in more detail, substantially the Pantone colors are used as the set of standard reference colors, the scope of the invention is not limited to this particular color reference system. Digital swatch books may also be generated on the basis of other standard color reference systems as e.g. the above-mentioned Munsell™ system, the RAL™ system or any other similar color system.

Despite the near universal conversion from analog processing methods to digital processing methods, professionals still rely on the use of traditional swatch books provided by a small number of specialized companies.

A digital swatch book in the sense of this invention is a digital counterpart of such a traditional swatch book. In some embodiments of the invention, a digital swatch book aims at providing professional graphic designers as well as less experienced users who work in a substantially digital work-flow and have the need to make color choices with a digital tool that has both a look-and-feel they are used to (i.e. that of a traditional color swatch book as provided by Pantone®) and that provides them with information on the basis of which they can make informed color, media and printing device choices. However, the scope of the invention is not limited to digital swatch book layouts which adapt the look-and-feel of traditional swatch books.

A digital swatch book in the sense of this invention enables the user to not only identify and handle digital representations of the original set of reference colors (e.g. the original colors from the PANTONE® Formula Guide), but also to identify and handle a simulated representation of the set of reference colors for a particular printing system, i.e. a set of colors printable with the printing system and which best fits the original set of print colors.

The term 'simulation' is used herein for the generation of a swatch book for a certain reproduction system and reproduction medium, and consequently a color of thus a swatch book is called a simulated color.

The term 'emulation' is used herein to indicate that simulated colors are 'soft-proofed', i.e. displayed or output on a monitor or a proofing printer in a manner to closely reproduce the simulated color (in the field of color management the term 'simulation' is often used for the soft-proofing, but in the present context of swatch-books 'simulation' is already used for the swatch book generation).

The need for simulating standard reference colors on a particular target printing device relates to the problem that a printing device normally cannot reproduce all colors in the reference system. Color Image reproduction devices such as printers, displays or projectors generally use a limited number of colorants, and colors of an image to be reproduced, that are not matched by one of these colorants, are mixed, or simulated at the device's output. Printers for instance can evoke the impression of millions of colors using cyan, magenta, yellow and black (CMYK) by using halftoning techniques. The swatches printed in the standard color swatch-books are samples of reference colors, referred to as solid or spot colors, whereas colors simulated by a combination of a small number of colorants through, for instance, a halftoning process on an offset press are so-called process colors.

Image reproduction devices such as printers, displays or projectors, however, cannot reproduce all the colors a typical set of standard colors like the one by Pantone® contains. In terms of color science, certain elements of the set of (for instance Pantone®) standard colors are not within a reproduction device's color gamut (a device's color gamut is the set of all colors the device can reproduce). The object of color simulation is to find a process color or a set of process colors of the target printing system which best fits a given reference color, or, respectively, a given set of reference colors. Without going into the details of color simulation, the present simulation process involves replacing out-of-gamut colors by reproducible ones, i.e. mapping out-of-gamut colors to colors within the printing system's color gamut.

Typically, the simulation is performed in a device independent color space such as the Lab-space, which implies that the set of reference colors is provided as a set of coordinates in the Lab-space.

As described above, the final result of the reference color simulation substantially depends on the color gamut of the printing system (and/or on the input gamut of the set of reference colors). Furthermore, the reference color simulation may also depend on additional parameters which have to be predetermined in advance and which permit imposing certain restrictions on the color mapping process performed by the simulation process in order to optimize the simulation result with respect to given requirements.

It is to be noted that, although the set of reference colors normally comprises a certain number of different reference colors, the embodiments are still viable, if only one particular reference color is input in the simulation system.

The term 'reproduction system' in general refers to a particular combination of a reproduction device (such as an offset press, a laser or an inkjet printer), ink (or whatever colorant) and media (such as glossy paper or canvas). In order to achieve an even more realistic description of a reproduction system, characteristics of the viewing conditions can also be included in the definition of the reproduction system. In the embodiments described below the reproduction device is a printing system, but the reproduction device can as well be another device type, e.g. a projector, etc.

Typically, a digital swatch book comprises simulated reference colors for multiple reproduction systems, e.g. a set of profiles describing a particular printing device and a number of different print media.

In order to generate a digital swatch book customized for a particular reproduction system, a device profile is used which describes the characteristics of the reproduction system. In the case that the reproduction device is a printing device, a 'reproduction system profile' characterizes this printing system, e.g. by describing the characteristics of printing device, print medium, ink and viewing conditions. According to the invention, a reproduction system profile is used to give a colorimetric interpretation to the simulations of reference colors on the corresponding reproduction system. In particular, the reproduction system profile permits transforming the simulated reference colors given in a device independent color space (PCS space) into a device dependent color space (which is usually RGB, CMYK, or Exachrome®) in which the process colors are defined.

The term 'digital swatch book information' (in the following: DSB information) used in the description of the embodiments which follow below refers generally to the computational result of a color simulation process as described above. The term DSB information thus refers to data which describes the obtained set of simulated reference colors, normally represented in the device space of the associated printing system. This information is typically given in form of a set of CMYK-coordinates representing the simulated reference colors. Using the printing system profile, the obtained CMYK-coordinates can be translated back into a device independent color space (PCS), e.g. into the Lab-space, whereby a device independent representation of the simulated reference colors is obtained which is comparable (but not identical) to the device independent description of the original set of reference colors used as starting point of the simulation. The term 'DSB information' refers to any viable representation of the simulated reference colors, irrespective of whether the representation is device dependent or not. In the embodiments described below in more detail, the term generally refers to both, a representation of the simulated reference colors in CMYK device coordinates, and a second representation of the same colors in Lab-coordinates.

It is to be noted that the term 'DSB information' is not restricted to information related to one particular print setup only. By contrast, a number of printing system profiles may be input to the DSB system for simulation of the standard set of reference colors for each of these printing system profiles. In this case, the DSB information decomposes into subsets each of which is related to the result of a simulation for one particular printing system profile. Thus, the resulting swatch book information may be used to generate a DSB including multiple customized swatch books each being customized for one particular combination out of a given set of combinations of printers, media, etc.

As an intermediate step of the generation of a digital swatch book, the above described DSB information is transformed into a platform independent data format. For this purpose, the system component which performs the simulation process further comprises modules which are arranged for transforming the DSB information into a computer readable format. Such modules might, for example, be a XML-module, an IT8-module or an ICC module. These modules permit changing the format in which the DSB information is output by the simulation component.

XML (Extensible Markup Language) is a W3C format that allows information and services to be encoded with meaningful structure and semantics that both computers and humans can understand. The XML format is thus useful for information exchange, and can easily be extended to include user-specific and application-specific tags.

It8 is an industry standard color reference target used to calibrate or characterize input and output devices.

The ICC specification defined by the International Color Consortium, which is also well known to professionals in color management is another alternative for decoding the DSB information.

As already mentioned above, the output file of the embodiments comprises both a device-dependent representation of the simulated colors and a device-independent representation. However, a device dependent representation, e.g. CMYK values must not necessarily be included since it can be obtained just as well by translating the Lab-values into the device space using an appropriate ICC profile.

As mentioned above, according to the embodiments, the DSB information is preferably output as a data file which complies with one of the above named standards, or similar approaches which has the advantage that the output file is platform Independent. However, the scope of the invention is not restricted to such standard formats. The DSB information may, as well, be further processed in any raw binary format or in any non-standard ASCII format.

The simulation component of the system can be used to request the equivalence of a single color in the given standard for a specific media and device, or for the whole of a swatch book. This last type of requests requires a pre-definition of the colors from which the swatch book is composed.

According to another aspect of the invention, a more user friendly digital swatch book is generated from the DSB information obtained from the simulation component by a 'portable document format generation component' of the DSB system. In the embodiments, the digital swatch book file generated by the portable document format generation component is embodied as a multi-layer PDF file adopting the well known ADOBE PDF standard. Thus the digital swatch book of the embodiments is a PDF file with a rich structure that provides a number of features which will now be described. The PDF generation component physically constructs the digital swatch book from the platform independent format in a way that enhances the user experiences by providing new ways to interact with the color simulations, e.g., with algorithms to search for colors.

The PDF file preferably features multiple layers of output information. In the embodiments described below in more detail, there is included e.g. a first layer which encodes first DSB output information intended for viewing the DSB on a display device, and a second layer which encodes second DSB output information intended for printing the digital swatch book on a printing system. In another embodiment, the PDF file further encapsulates a PDF/X3 object which is a print-ready version of the digital swatch book.

If the DSB information does not contain a device dependent representation of the simulated reference colors, an ICC profile characterizing the intended printing system (e.g. printer, media, ink and viewing conditions) is used to generate the second swatch book output information intended for printing the DSB information with this printing system. This gives a colorimetric interpretation to the simulations of Pantone® colors on the corresponding printing system.

Using the ICC profile is, however, superfluous if the DSB information already comprises a representation of the simulated reference colors in the device space of the target printing system.

Using device profiles for generating the PDF file, the DSB information which was created for a particular reproduction system can also be printed on another printing system, e.g. a proofing system, which was not involved in the reference color simulation process. Thereby, a meaningful emulation of the simulated reference colors can be obtained on this other printing system—assuming that the simulated colors are within the color gamut of this other printing system.

The second output information mentioned above is intended for displaying the digital swatch book on a display screen. The DSB generator uses information from an ICC profile characterizing the display on which the DSB is to be viewed and incorporates this information into the PDF file as an independent layer of simulation that is transparent to the user. This means that when the user looks at a color patch on a calibrated monitor, what is rendered on the monitor is a simulation layer specially adapted for viewing the swatch book on the display screen rather than the data generated for the target printing system. Printing instead uses the first layer mentioned above that is not rendered on the monitor but only used for prints.

These features result in the instance of the DSB displayed on the display screen and the instance of the DSB printed with the printing system being close to each other and both instances are based on data computed specifically for each of the two devices. Hence simulation is inherent in the system, and transparent in its usage.

In order to guarantee a really portable, reliable and replicable electronic document representation of a color guide, an embodiment of the digital swatch book as described below in more detail comprises a further layer which is provided by translating the DSB information into a PDF/X3 representation that can be accessed interactively by the user. PDF/X3 is the prepress standard for "print ready" PDF files (see ISO "ISO 15930-3:2002 Graphic technology—Prepress digital data exchange—Use of PDF—Part 3: Complete exchange suitable for colour-managed workflows (PDF/X-3)", ISO, 2002), which is widely accepted by print service providers.

In the embodiments, the swatch book generation component generates for all swatch books a skeleton book comprising custom swatch books for each printing system profile (input profile).

Using interactive PDF for generating the digital swatch books allows providing the user with enhanced functionality as e.g. an automated search through the digital swatch book for particular colors.

A digital swatch book embodied as a PDF file also permits features related e.g. to the interactive access to particular parts of the swatch book. For example, the PDF file may be encrypted to prevent unauthorized changes, and regulate access control. Using access control allows e.g. defining in detail which layers are printable and which ones are only intended for display on a monitor. Unauthorized tampering with the PDF file can be prevented using standard 128-bit PDF encryption, which is accepted in the publishing market as sufficiently secure.

Turning now to the layout of the digital swatch book as defined in the PDF file.

In general, the PDF format is compatible with any layout of the DSB. In the embodiments described below, the layout of the DSB mirrors that of the original PANTONE® Formula Guide, which allows for a direct comparison of original and simulated colors (either on a display or in print) and therefore a judgment on how close these colors are. Even though such an orientation at the layout of the original swatch book of the chosen set of reference color is helpful, other layouts may be used as well.

In some embodiments, the DSB also shows what CMYK or RGB values are used by the printer to provide a reference color simulation and it also gives an indication of whether the simulation matches the original or whether the original is outside the printed gamut. Furthermore this indication of the level of mismatch can be provided either by providing color difference values directly in terms of ΔEs (a measure of distance in color space) or by only giving an out-of-gamut rating which is more accessible to inexperienced users.

Furthermore, a "See other media" link shown below each color patch of the DSB can be provided. When the matching of a reference color is more important than the choice of media, the user can click on this link which shows matching information of a color on a number of media available on the given printer.

Returning now to FIG. 1 which illustrates an embodiment of the system for generating digital swatch books.

The system 1 for generating digital books comprises two main components, a simulation component 3 and a PDF generation component 5. The simulation component is arranged to simulate a set of standard reference colors 11 for a set of given reproduction systems (here printing systems), each of which is described by a corresponding reproduction system profile 7 (here a printing system profile). The printing system profile 7 describes characteristics of a printing device, printing medium, and viewing conditions and is provided in the form of an ICC device profile. The simulation component 3 receives a definition of the set of color references in the form of a data file 11 in a given standard or non-standard data format suitable for the communication of color values. In the embodiment depicted in FIG. 1, the set of reference colors defines spot colors of the well-known standard Pantone® Formula Guide.

Based on a predetermined color simulation technique, the simulation component 3 determines from the given set of Pantone® colors 11 and given ICC profiles 7 a set of simulated Pantone® colors 13. The data defining the resulting set of simulated Pantone® colors (generally denoted as digital swatch book information, or DSB information) is stored in an ASCII file adopting a color specification format which is preferably based on the XML standard. Being XML compliant, the resulting data file is platform-independent and can easily be processed in the further work-flow. Details as to the content of this data file are given later when describing FIG. 3.

The XML file 13 representing the set of simulated Pantone colors is further processed by a second component 5 which generates, based on the DSB information in the input file 13, a self-contained and user-friendly PDF file 15 which constitutes the digital swatch book. This PDF file can be used by professionals such as designers or device manufacturers as a digital replacement of conventional swatch books, providing a number of enhanced features which are only possible with a digital swatch book as described by these embodiments. Such enhanced features will be described in more detail with reference to FIGS. 4 to 9. If necessary, the PDF generation component 5 uses printing system profiles 7 or ICC display profiles 9 in order to produce printable and/or viewable versions of a simulated swatch book. Using ICC profiles of the output devices permits emulating the simulated swatch book on any output device of interest. The resulting PDF swatch book is self-contained, which means that it contains all information necessary to simulate the swatch book on a given set of output devices. In particular, there is no necessity for specialized software to view or print the digital swatch book. In the embodiment described here, the user opens ADOBE's ACROBAT READER to view and print the digital swatch book. Furthermore, the digital swatch book 15 comprises interactive means which provide special functionality to the user which is described in more detail below (see FIGS. 5-9)

Figure 2:
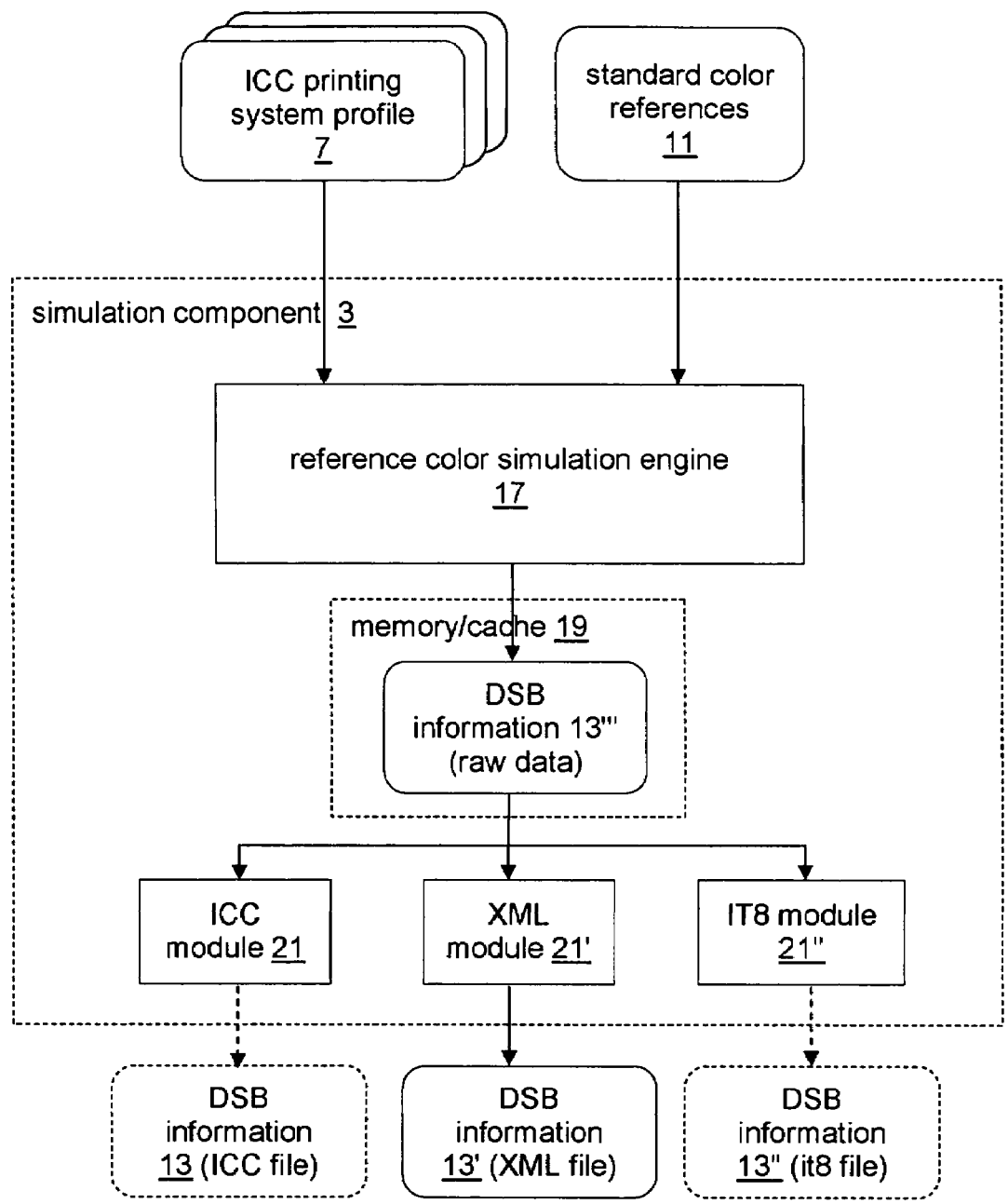
FIG. 2 is a block diagram of an embodiment of the simulation component of the system for generating digital swatch books.

FIG. 2 shows simulation component 3 in more detail. The ICC printing system profiles 7 and the Pantone® color references 11 are input to a reference color simulation engine 17 which computes, for each of the given printing system profiles 7 and based on the set of standard reference colors 11, a simulated set of standard colors lying within the respective printing system's color gamut. In the embodiment, the resulting colors match the given set of standard colors as far as possible. A standard gamut mapping algorithm can be used to determine the simulated colors. In the embodiment, either a "hue-preserving minimum delta-E" algorithm or a "SGCK" algorithm, both described in "CIE 156:2004—Guidelines for the Evaluation of Gamut Mapping Algorithms", published in 2004 by the CIE—Commission Internationale de l'Eclairage, is used to perform the gamut mapping and the matching of the reference colors. Of course, the above identified algorithm can be replaced just as well by a more powerful matching algorithm which is optimized for finding the best simulation of a given set of reference colors under given conditions.

The resulting DSB information 13''' is stored in a memory or a cache 19 for further processing. From the raw data which is output by the reference color simulation engine 17, a platform-independent data file is obtained by using modules 21, 21' and 21" of the simulation component 3 which permit converting the raw data into a platform-independent format. The system described in FIG. 2 comprises three modules, an ICC module 21, an XML module 21' and an it8 module 21", each of which is arranged to convert the raw data 13''' into the corresponding platform-independent format. The system allows a selection of the particular output format of interest. In the embodiment of FIG. 2, the system is depicted in a default configuration in which it generates an XML file 13'. Selectively, the system can also output the DSB information as an ICC file 13 or as an it8 file 13".

FIG. 3 shows an example of a DSB information file 13 coded in a XML compliant format as produced by module 21' in FIG. 2. The XML format is a well known standard, so that the explanation here focuses on the data entries of interest. The <name> element codes a title of the digital swatch book, here "Sample Swatch Book". Following the tags identifying author and version of the data file, the <device> and <media> elements identify the particular output device and output media for which the swatch book is customized, in this case a hp designjet device and the media Proof Matte. The <printMode> element which follows then gives additional information as to the printing mode for which the swatch book is customized, in this case a 600×600 print resolution. The next element named <colorSpace> identifies the color space to which the data thereafter refers. This header information following, data defining individual pages of the swatch book can be identified. In FIG. 3, there is one swatch book page displayed which is described by the data block bracketed by the  and  tags. Multiple blocks of this type can follow subsequently, each block defining a page of the customized swatch book. Each swatch book page definition contains a number of fields, each field being identified by bracketing <field> tags. In the example file, the individual field elements are bracketed by additional <fields> and </fields> tags. Each <field> element contains information as to a particular swatch book color. In the embodiment, this information comprises the Pantone® name of the color, in this case "Yellow C" for the first field on the page. Furthermore, the <formula> element defines the device dependent color definition of the simulated color as determined by the simulation engine 17 for the identified output device (here CMYK values 3.5, 0.0, 97.5, and 0.0). Then, a device independent representation of this color is provided by the <lab> element (here lab values 84, 4, 90). Furthermore, the <field> element also includes information as to the mismatch between the simulated color and the original reference color, which is bracketed by the <deltas> and </deltas> tags. In the embodiment shown in FIG. 3, the value provided by the <deltas> element is the Euclidian distance $\Delta E$ of the two colors in color space (here $\Delta E = 13.65$ for Pantone® Yellow C).

Not shown in FIG. 3 is the possibility of including several swatch books in one XML file, where each swatch book may be customized for a particular printer/media combination.

Figure 4:
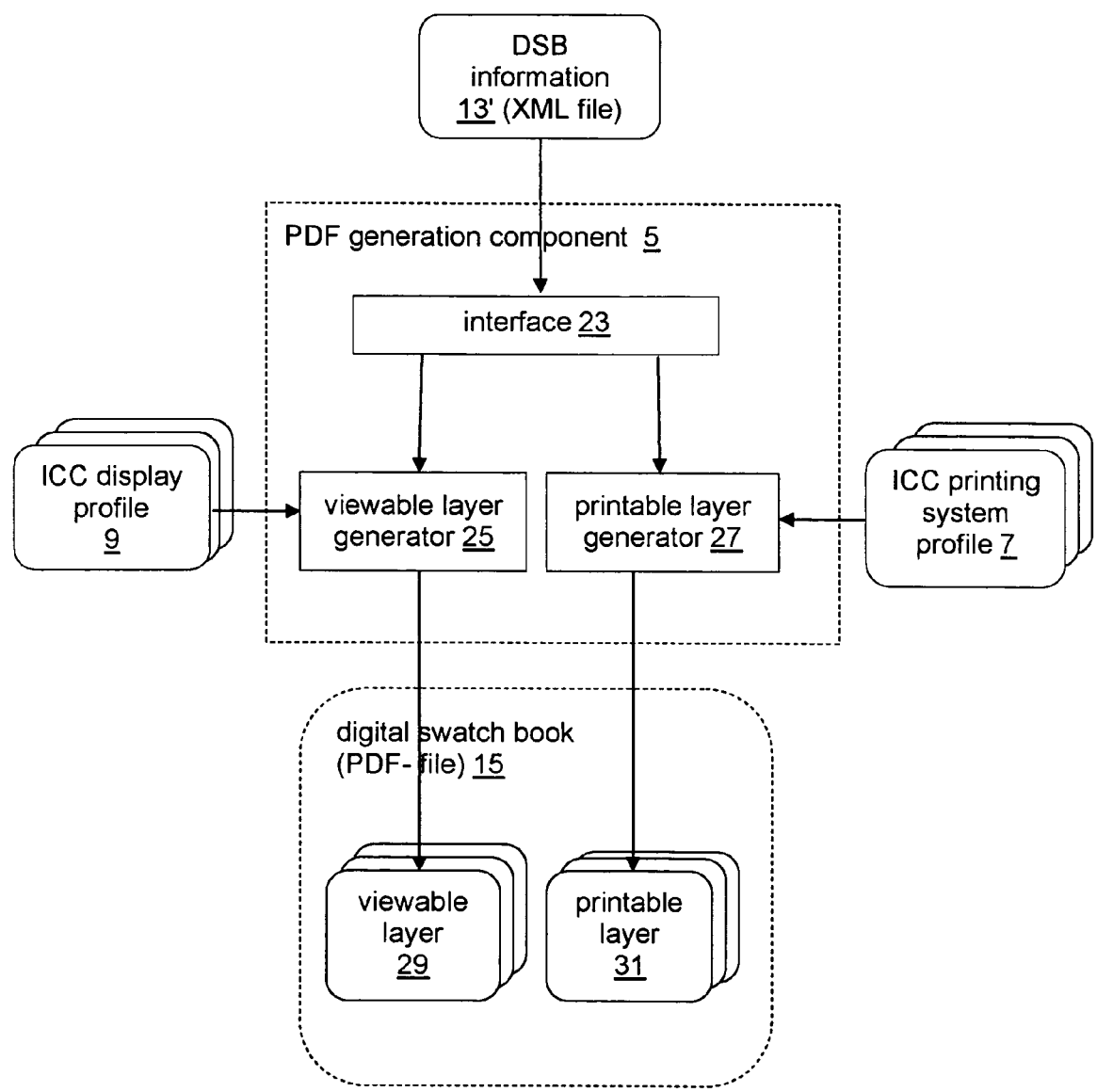
FIG. 4 is a block diagram of an embodiment of the PDF generation component of the system for generating digital swatch books.

Turning now to a detailed description of PDF generation component 5, as shown in the diagram of FIG. 4, the PDF generation component 5 comprises an interface 23 which receives and interprets the device-independent data file containing the DSB information 13 calculated by the simulation engine 17 of the simulation component 3. A viewable layer generator 25 evaluates the DSB information 13 in order to produce, from the given Lab values of the simulated reference colors, a representation of the simulated swatch book which is customized for a particular display device. An ICC profile 9 of the display device is used for a meaningful interpretation of the device independent colors defined by the Lab values. Viewable layer generator 25 produces a PDF object 29 which represents a version of the digital swatch book intended for viewing it on the corresponding display device. As indicated in FIG. 4, several PDF objects may be obtained in this way, each PDF object 29 representing an individual version of the digital swatch book customized for a particular display device. Similarly, printable layer generator 27 produces, based on a set of ICC printing system profiles 7, PDF objects 31 each representing a version of the digital swatch book intended for printing on a particular output device. It is to be noted that even though the ICC profiles in FIG. 4 are denoted with the same reference numeral as the ICC profiles used by simulation component 3 shown in FIG. 1, this does not necessarily imply that these ICC profiles are identical. By contrast, since the DSB information 13 already contains a device dependent representation of the simulated colors, printable layer generator 27 must not interpret this data again when preparing a printable layer 31 intended for printing on the same device, for which the data was simulated. However, interpretation is necessary in case that the simulated reference colors are to be output on another device not involved in the simulation performed by simulation component 3.

The resulting objects 29, 31 all are included in one PDF file 15 as distinct PDF layers. In this way, a self-contained swatch book 15 is obtained, which is customized for viewing and printing on a predetermined set of output devices.

Figure 5:
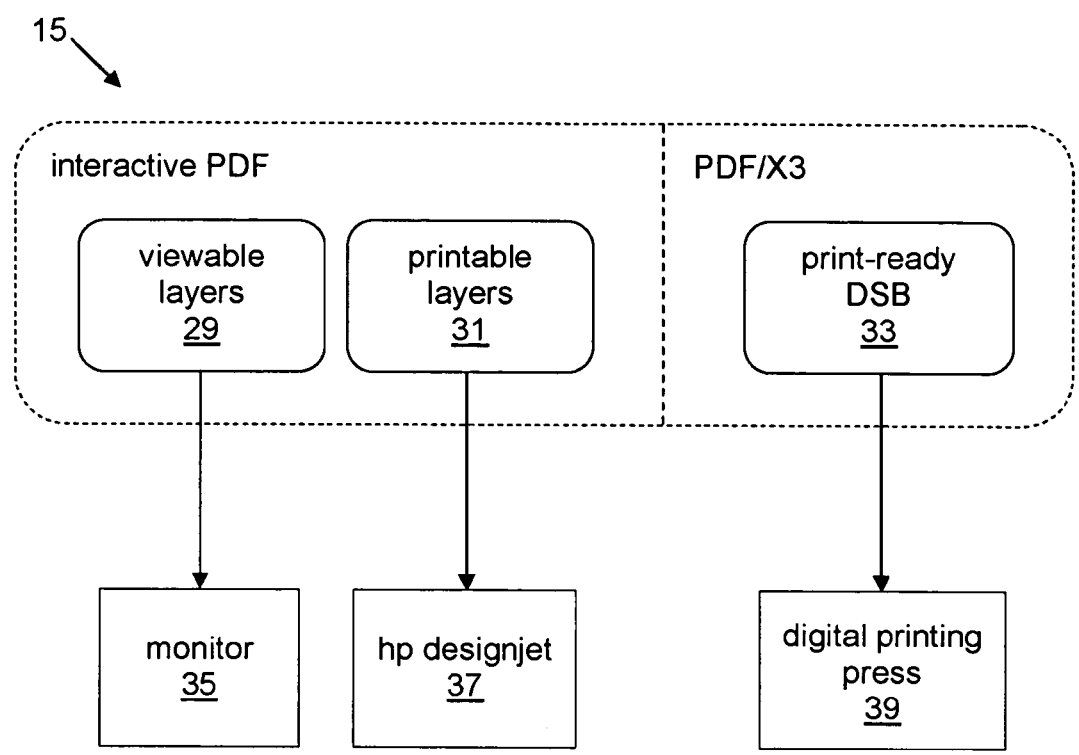
FIG. 5 is a block diagram of a PDF file embodying a digital swatch book which features multiple interactive PDF layers and an encapsulated PDF/X3 object.

Optionally, as depicted in FIG. 5, the PDF generation component 5 may also contain a PDF/X3 generation component (not shown in FIG. 4). This component is arranged to produce a print-ready version of the digital swatch book customized for a particular printing device 39 (a digital printing press in the embodiment of FIG. 5). This customized PDF/X3 version 33 of the digital swatch book can be included as an encapsulated object in one single PDF file 15 together with the viewable layers 29 and printable layers 31 which are compatible with the standard PDF format and intended for display on a monitor 35 and, respectively, a printer 38 (a hp DesignJet in the embodiment of FIG. 5). The self-contained structure of the digital swatch book 15 thus is maintained even when mixing PDF/X3 and standard PDF objects.

Such an embodiment of a digital swatch book provides several features as detailed further on. As FIG. 5 suggests, the digital swatch book 15 is a self-contained, portable and universal product which is customized for output on a number of predetermined output devices. As such, it can be used throughout a complex work-flow comprising several stages involving different computing platforms, devices and process steps. The digital swatch book provides the professionals and everybody involved in the work-flow with a single universal reference defining colors.

Referring to FIG. 5, the PDF/X3 version 33 of the digital swatch book permits perfect reproduction of the swatch book, whilst the viewable and printable PDF layers 29, 31 encoded in standard PDF permit a seamless software simulation of the digital swatch book. The PDF file can be arranged such that, when opening the PDF-file with Acrobat Reader, only the viewable layer is automatically displayed on the monitor. This viewable layer is arranged as a non-printable layer. On the other hand, the printable layers are arranged such that they cannot be viewed on a display device. However, the correct printable layer is automatically printed when the user prints the swatch book on a particular printing device. This functionality can be achieved without requiring additional interaction with the swatch book user.

Figure 6:
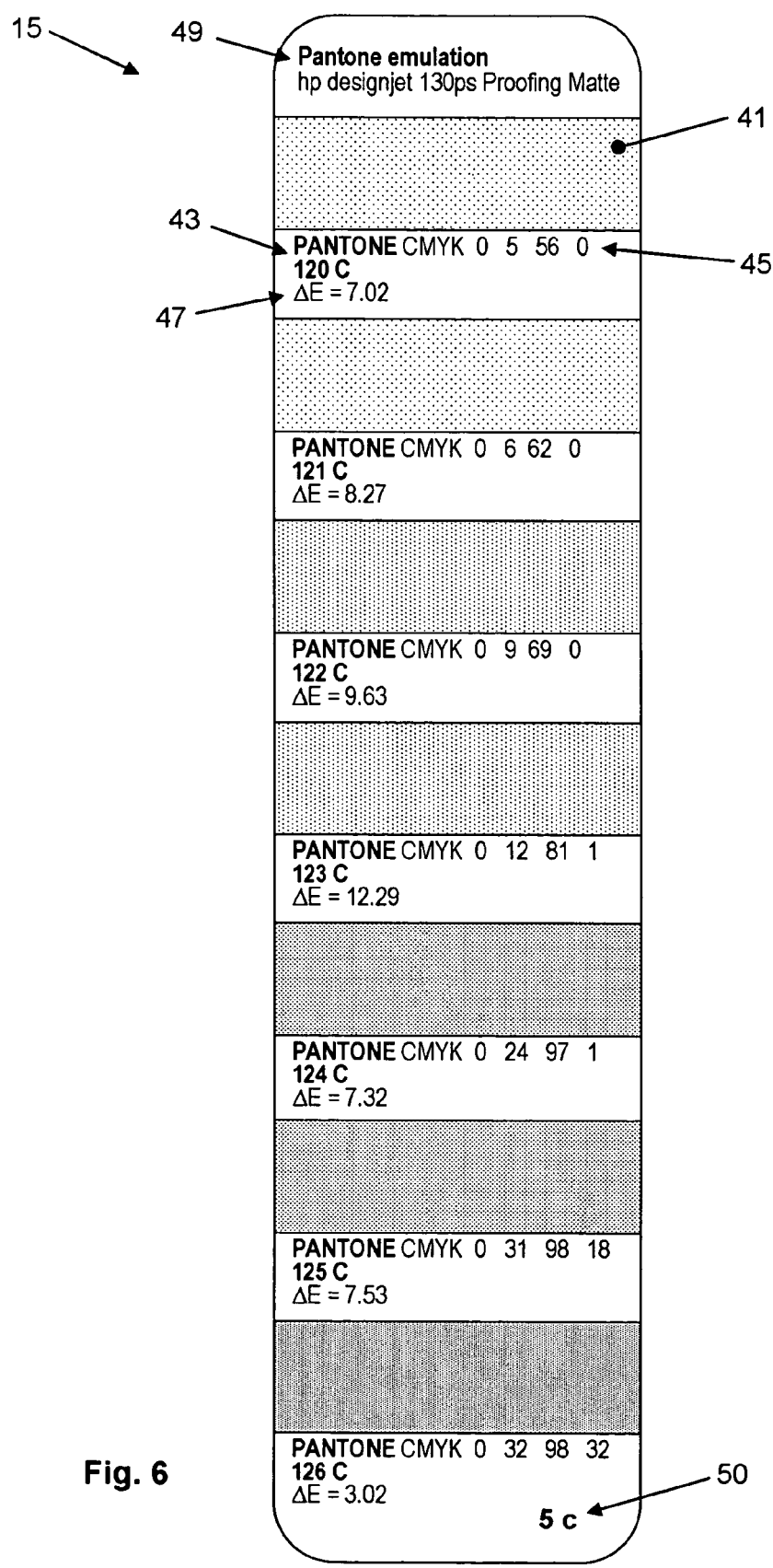
FIG. 6 is an exemplary layout of a page of the digital swatch book as displayed on an output device, the layout being adapted to the layout of the known Pantone® Formula Guide.

FIG. 6 shows an exemplary layout of a page of a digital swatch book 15 as generated by the system proposed by this invention. According to this embodiment, the layout of the digital swatch book page shown in FIG. 6 matches that of the traditional Pantone® Formula Guide. The content of the page displayed in FIG. 6 matches the structure determined by the DSB information shown in FIG. 3. The page comprises seven color fields 41, each identifying a simulated Pantone® color. Under each color field, the name 43 of the Pantone® color, the CMYK coordinates 45 of the color, and the to-gamut-distance 47 of the simulated color from the original reference color is displayed. The page comprises a page title 49 identifying the name of the reference color system and the printing device on which the color simulation was based and at the bottom there is provided an identifier 50 indicating the currently displayed Pantone® swatch book page (here page "5 c").

The fact that the digital swatch book 15 adapts the layout of the traditional swatch book (i.e. the Pantone® swatch books) permits an easy and direct comparison of a traditional swatch book and its digital counterpart, e.g. when calibrating a display device.

Furthermore, the use of interactive PDF for embodying the digital swatch book permits a variety of enhanced applications of the swatch book which will now be described in more detail.

Figure 7:
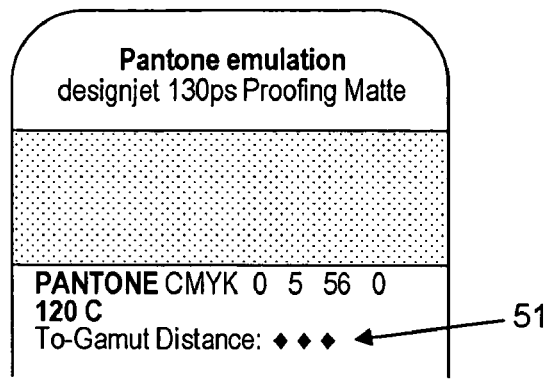
FIG. 7 is an alternative layout of the digital swatch book which displays the to-gamut distance of a color as a pictorial representation of this distance.

As depicted in FIG. 7, the to-gamut distance of a reference color can not only be provided as a $\Delta E$ value, but it can also be given as a pictorial representation 51 of this $\Delta E$ value. This will be appreciated by less experienced users of the swatch book who cannot correctly interpret numerical gamut distances.

Figure 8:
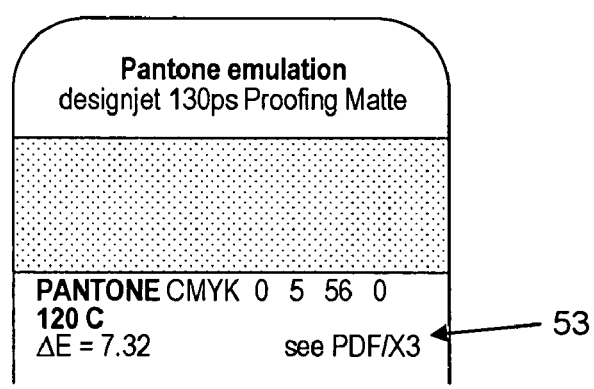
FIG. 8 is a viewable digital swatch book page featuring a "see PDF/X3" link for changing into a print-ready PDF/X3 printing mode of the swatch book.

As depicted in FIG. 8, interactive PDF permits the incorporation of links which point to other objects encapsulated in the PDF file. Using such a link, a "see PDF/X3" trigger 53 can be included in the viewable layer of the DSB which permits the user to switch to a PDF/X3 version of the swatch book.

Figure 9:
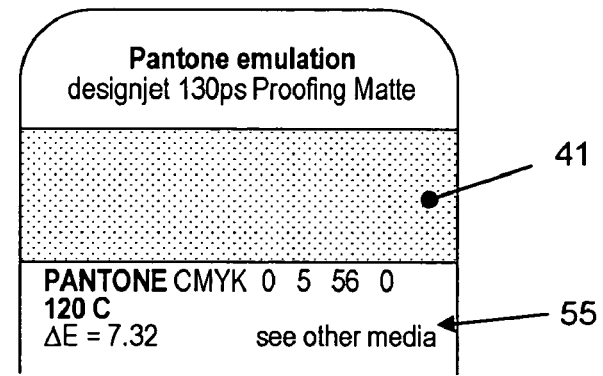
FIG. 9 is the result of the rendering of a viewable digital swatch book layer featuring a "see other media" link for triggering display of a special page which permits a comparison of the simulation quality of a given color for a number of predetermined print media.

Another application rendered possible by interactive PDF swatch books is depicted in FIG. 9. Here, the viewable layer of the DSB contains a "see other media" link 55 which permits switching from the standard layout of the Pantone® page to a special page displaying, for the associated reference color 41, corresponding simulations of this reference color for the same printing device but for a number of other predetermined print media. This requires that the digital swatch book comprises simulation layers for all involved print media.

Figure 10:
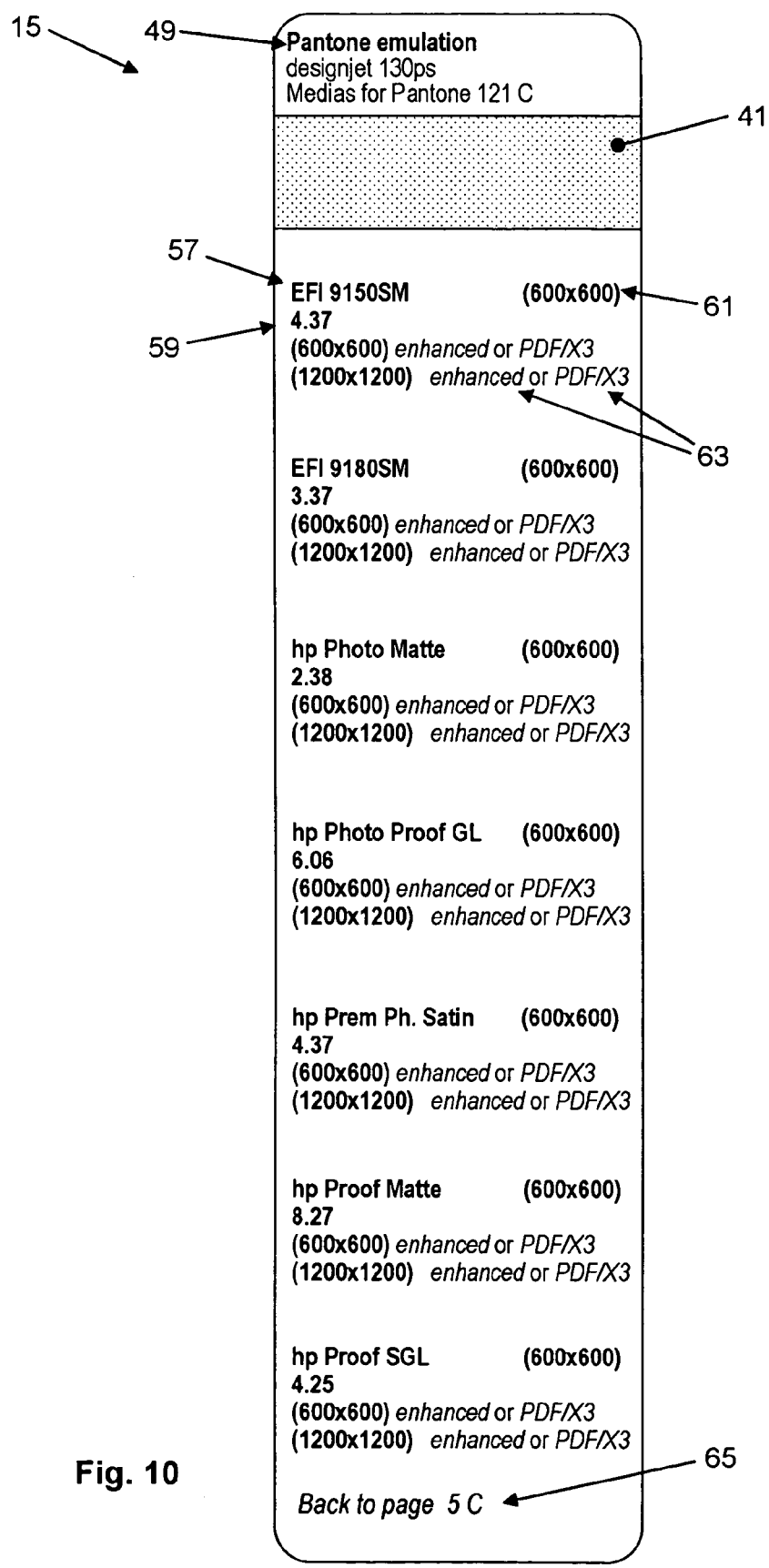
FIG. 10 is a special swatch book page which permits comparing the simulation quality of a given color for a number of predetermined print media.

An exemplary result of the "see other media" feature is depicted in FIG. 10 which was obtained when clicking on the "see other media" link 55 shown in FIG. 9 under "Pantone® 121 C". When the user clicks on this link, a new page is displayed showing the target color 41 and modified page title information 49 on top of the page. The target color corresponds to the selected "Pantone® 121 C" which is also indicated in the page title 49. Under the color field 41, a number of predetermined print media is listed. For each print medium, the name 57 is indicated together with the print resolution 61 for which the reference color simulation was performed. Under the name of the print medium, the to-gamut distance of the simulated reference color for the particular print media is given in form of a $\Delta E$ value. From this information, the user can easily derive that the selected spot color is best reproduced with "hp Photo Matte" media on the DesignJet 130ps.

Interactive links 63 are provided which permit viewing a version of the swatch book page "5 c" simulated for the corresponding print medium. A "Back to page 5 c" link displayed at the bottom of the page permits the return back to the Pantone® page as depicted in FIG. 6. As can be seen from FIG. 10, selecting "HP Photo Matte" instead of "HP Proof Matte" is of help to users for reproducing "PANTONE® 121 C" with just 2 color difference units of error as opposed to 8.

Thus, the described embodiments provide a digital counterpart of traditional color swatch books which is universal, platform-independent, portable and self-contained. The interactive PDF structure achieves a variety of applications of the digital swatch book, which are not possible with traditional swatch books.

The described embodiments enable print service providers to advertise themselves and provide customer care by providing their customers with personalized, free digital swatch books. In this way, a creative professional who is a customer of a print service provider can predict what the final printed output will be when using that print service provider. This enhances expectations, optimizes costs and reassures all parties involved. Furthermore, using platform independent data formats such as XML, it8 or ICC has major implications concerning the use of these components in different parts of a printing workflow, e.g., when used inside a printer, or in a RIP or as part of the graphics workflow.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-readable medium storing computer-executable instructions for a system for generating digital swatch books, comprising:
   a simulation component for generating, based on a set of standard reference colors and based on at least one reproduction system profile representing a reproduction system's color reproduction characteristics, digital swatch book information representing a simulated set of reference colors associated with the original set of reference colors, as reproduced by the reproduction system;
   a portable document format generation component, comprising:
      a viewable layer generator for:
         producing, from lab values of the simulated set of reference colors, a representation of a simulated swatch book which is customized for a display device; and
         producing a first portable document format object representing a version of the digital swatch book customized for the display device; and
      a printable layer generator for producing, based on a set of printing system profiles, a second portable document format object representing a version of the digital swatch book customized for printing on a particular output device,
   wherein the portable document format generation component is configured to include the first and second portable document format objects in a portable document format (PDF) file as distinct layers.

2. The computer-readable medium of claim 1, wherein the set of standard reference colors is defined by the PANTONE-system or by the RAL™-system.

3. The computer-readable medium of claim 1, wherein a reproduction system profile represents characteristics of a certain combination of a reproduction device and a reproduction medium.

4. The computer-readable medium of claim 3, wherein the simulation component is arranged to generate digital swatch book information for a set of reproduction systems such that the generated digital swatch book information comprises subsets, each subset representing simulated reference color information for a certain combination of reproduction device and reproduction medium included in the set of reproduction systems.

5. The computer-readable medium of claim 4, wherein the generated multi-layer portable document file comprises for each reproduction system in the set of reproduction systems a first layer encoding the first swatch book output information for viewing the digital swatch book, and a second layer encoding the second swatch book output information for printing the digital swatch book.

6. The computer-readable medium of claim 1, wherein the simulation component comprises modules for encoding the digital swatch book information according to the platform-independent XML-standard, it8-standard, or ICC-standard.

7. The computer-readable medium of claim 1, wherein the portable document format generation component is arranged such that the first swatch book output information is calculated based on a device profile of the display device, and such that the second swatch book output information is calculated based on a device profile of the printing device.

8. The computer-readable medium of claim 7, wherein reproduction system profiles, the printing device profiles and the display device profiles are compliant with the standard ICC specification.

9. The computer-readable medium of claim 1, wherein the portable document format generation component is arranged to generate a portable document format which complies with Adobe PDF™ standards.

10. The computer-readable medium of claim 1, wherein the portable document format generation component is further arranged to encapsulate into the PDF file a PDF/X3 object representing a print-ready version of the digital swatch book.

11. The computer-readable medium of claim 1, wherein the portable document format generation component is further arranged to integrate interactive means into the PDF file which permit a user of the digital swatch book to browse the digital swatch book, to search for colors in the digital swatch book, to change viewing parameters of the digital swatch book, or to trigger enhanced functionality of the digital swatch book.

12. The computer-readable medium of claim 1, wherein the portable document format generation component is arranged to generate a portable document format file defining a layout of the digital swatch book which mirrors the layout of a traditional standard color reference swatch book.

13. The computer-readable medium of claim 1, wherein the portable document format generation component is arranged to generate a portable document format file which represents swatch book pages displaying a simulated color's CMYK coordinates in association with each color field.

14. The computer-readable medium of claim 1, wherein the portable document format generation component is arranged to generate a portable document format file which represents swatch book pages displaying a simulated color's to-gamut distance in association with each color field.

15. The computer-readable medium of claim 1, wherein the portable document format generation component is arranged to generate a portable document format file which represents swatch book pages displaying a reference color's to-gamut distance in association with each color field.

16. The computer-readable medium of claim 1, wherein the portable document format generation component is arranged to generate a portable document format file which represents swatch book pages displaying a reference color's to-gamut distance in association with each color field, the to-gamut distance being displayed as a pictorial representation of the distance value.

17. The computer-readable medium of claim 10, wherein the portable document format generation component is arranged to generate a portable document format file which represents swatch book pages comprising a "see PDF/X3" link for switching the PDF file into a mode in which a print-ready PDF/X3 representation of the digital swatch book is printed.

18. The computer-readable medium of claim 1, wherein the portable document format generation component is arranged to generate a portable document format file which represents swatch book pages displaying a "see other media" link in association with each color field, the "see other media" link switching the PDF file into a mode in which, for a number of predetermined print media, information about the printing characteristics of the reference color associated with that link are displayed for each of the predetermined print media.

19. A digital swatch book, which is stored on a machine-readable medium including a multi-layer portable document format file which comprises a first layer encoding first swatch book output information customized for viewing the digital swatch book on a display device, and a second layer encoding second swatch book output information customized for printing the digital swatch book on a printing device, the first and second swatch book output information representing a simulated set of reference colors associated with an original set of reference colors, as reproduced by at least one reproduction system.

20. A computer-readable medium storing computer-executable instructions for performing a method of generating digital swatch books, comprising:
  a first step of generating, based on a set of standard reference colors and based on at least one reproduction system profile representing a reproduction system's color reproduction characteristics, digital swatch book information representing a simulated set of reference colors associated with the original set of reference colors, as reproduced by the reproduction system;
  a second step, comprising:
  producing, from lab values of the simulated set of reference colors, a representation of a simulated swatch book which is customized for a display device; and
  producing a first portable document format object representing a version of the digital swatch book customized for the display device;
  producing, based on a set of printing system profiles, a second portable document format object representing a version of the digital swatch book customized for printing on a particular output device; and
  including the first and second portable document format objects in a portable document format file as distinct layers.

* * * * *

UNITED STATES PATENT AND TRADEMARK OFFICE
CERTIFICATE OF CORRECTION

PATENT NO. : 7,576,890 B2 Page 1 of 1
APPLICATION NO. : 11/254674
DATED : August 18, 2009
INVENTOR(S) : Jose Abad Peiro et al.

It is certified that error appears in the above-identified patent and that said Letters Patent is hereby corrected as shown below:

In column 14, lines 2-3, in Claim 2, delete "PANTONE-system" and insert -- PANTONE®-system --, therefor.

Signed and Sealed this

Fourteenth Day of September, 2010

David J. Kappos
*Director of the United States Patent and Trademark Office*